United States Patent
Huang et al.

(10) Patent No.: US 9,191,577 B2
(45) Date of Patent: Nov. 17, 2015

(54) METHOD FOR CONTROLLING REFLECTIVITY IN IMAGING SYSTEM

(71) Applicant: Chung-Shan Institute of Science and Technology, Taoyuan County (TW)

(72) Inventors: Shih-Shinh Huang, Taoyuan County (TW); Min-Fang Lo, Taoyuan County (TW)

(73) Assignee: NATIONAL CHUNG INSTITUTE OF SCIENCE AND TECHNOLOGY, Taoyuan (TW)

( * ) Notice: Subject to any disclaimer, the term of this patent is extended or adjusted under 35 U.S.C. 154(b) by 231 days.

(21) Appl. No.: 14/096,297

(22) Filed: Dec. 4, 2013

(65) Prior Publication Data
US 2015/0156390 A1  Jun. 4, 2015

(51) Int. Cl.
  *H04N 5/235* (2006.01)
  *G02F 1/133* (2006.01)
  *G03B 9/08* (2006.01)

(52) U.S. Cl.
  CPC .......... *H04N 5/2355* (2013.01); *G02F 1/13306* (2013.01); *G03B 9/08* (2013.01)

(58) Field of Classification Search
  CPC ..... H04N 5/2355; G02F 1/13306; H03B 9/08
  See application file for complete search history.

(56) References Cited

U.S. PATENT DOCUMENTS

| | | | |
|---|---|---|---|
| 7,195,379 B2 * | 3/2007 | Shaffer | 362/465 |
| 7,489,303 B1 * | 2/2009 | Pryor | 345/173 |
| 7,973,838 B2 * | 7/2011 | McCutchen | 348/276 |
| 8,224,083 B2 * | 7/2012 | Hashizume | 382/167 |
| 8,243,285 B2 * | 8/2012 | Fishbaine | 356/603 |
| 9,035,867 B2 * | 5/2015 | Yoshida | 345/102 |
| 9,036,060 B2 * | 5/2015 | Kaizu et al. | 348/273 |
| 2007/0263174 A1 * | 11/2007 | Shyu et al. | 353/34 |
| 2009/0128451 A1 * | 5/2009 | Tokui | 345/55 |
| 2012/0086933 A1 * | 4/2012 | Spruck et al. | 356/5.01 |

* cited by examiner

*Primary Examiner* — Katrina Fujita
(74) *Attorney, Agent, or Firm* — Chun-Ming Shih

(57) ABSTRACT

A method for controlling reflectivity in imaging system has steps of establishing a model describing the input image is a linear combination of a body reflection and an interface reflection; eliminating the minimum component of RGB for each pixel of the input image, and adding a mean of a sum of the minimum RGB chromaticity of the pixels to the input image to be modified; using a threshold strategy to identify at least one highlight region and at least one non-highlight region in input image; reconstructing color information of the at least one highlight region and obtaining a reconstructed image considering as the body reflection; evaluating the weights of the body reflection and the interface reflection; eliminating the interface reflection term of input image and considering the body reflection term as a reference image; and controlling the LCOS reflector to modify the input image according to the reference image.

10 Claims, 4 Drawing Sheets

METHOD FOR CONTROLLING REFLECTIVITY IN IMAGING SYSTEM

BACKGROUND OF THE INVENTION

1. Field of the Invention

The present invention relates to a method for controlling reflectivity in imaging system, and more particular to controlling a liquid crystal on silicon (LCOS) which is applied to an optical reflector capable of selectively reflecting light to prevent image from overexposure.

2. Description of the Related Art

Currently, in the related art of suppressing image overexposure (or anti-blooming), the principle is to expand the dynamic range for image expressing, o especially to the nighttime image having extraordinary brightness variation. Generally, the solutions of that are divided into two ways of hardware modification and algorithm computation.

Regarding the hardware solution, a way is to additionally install a transmitting controller to handle the transmitting light to be sensed, which is known as an anti-blooming cell, and has a benefit of fast processing speed. However, this kind of hardware installation may directly influence the effective resolution of the image.

Regarding the software solution, conventional means such as image alignment, high dynamic range generation and object movement removal have been used in the art. However, most algorithms are not adapted to an imaging device installed on a high-speed moving stage, for example, on a car. Because it may cause the image alignment variable and influence the computation result. Moreover, this technique may reduce the image frame rate due to a large computation burden.

SUMMARY OF THE INVENTION

The objective of the present invention is to provide a method for controlling reflectivity in imaging system, in which an active gate is applied to a reflector providing adjustable reflectivity depending on the blooming position of sensed image.

In order to achieve the foregoing purpose, the method for controlling reflectivity in imaging system is applied to deal with an input image and controlling a optical modulator such as LCOS, includes steps of: establishing a model describing an input image is a linear combination of a body reflection and an interface reflection, from objects; eliminating the minimum component of RGB for each pixel of the input image; adding a mean of a sum of the minimum RGB chromaticity of the pixels to the input image, and converting into a modified image; determining whether the difference between the input image and the modified image is greater/less than a threshold value to identify at least one highlight region and at least one non-highlight region in the input image; reconstructing color information of the at least one highlight region, by copying similar colors from a predetermined non-highlight area next to the at least one highlight region, and obtaining a reconstructed image considering as the body reflection; evaluating the weights of the body reflection and the interface reflection for the linear combination by the use of least-square estimation; eliminating the interface reflection term of the input image and considering the body reflection term as a reference image; and controlling the LCOS reflector to modify the input image according to the reference image.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
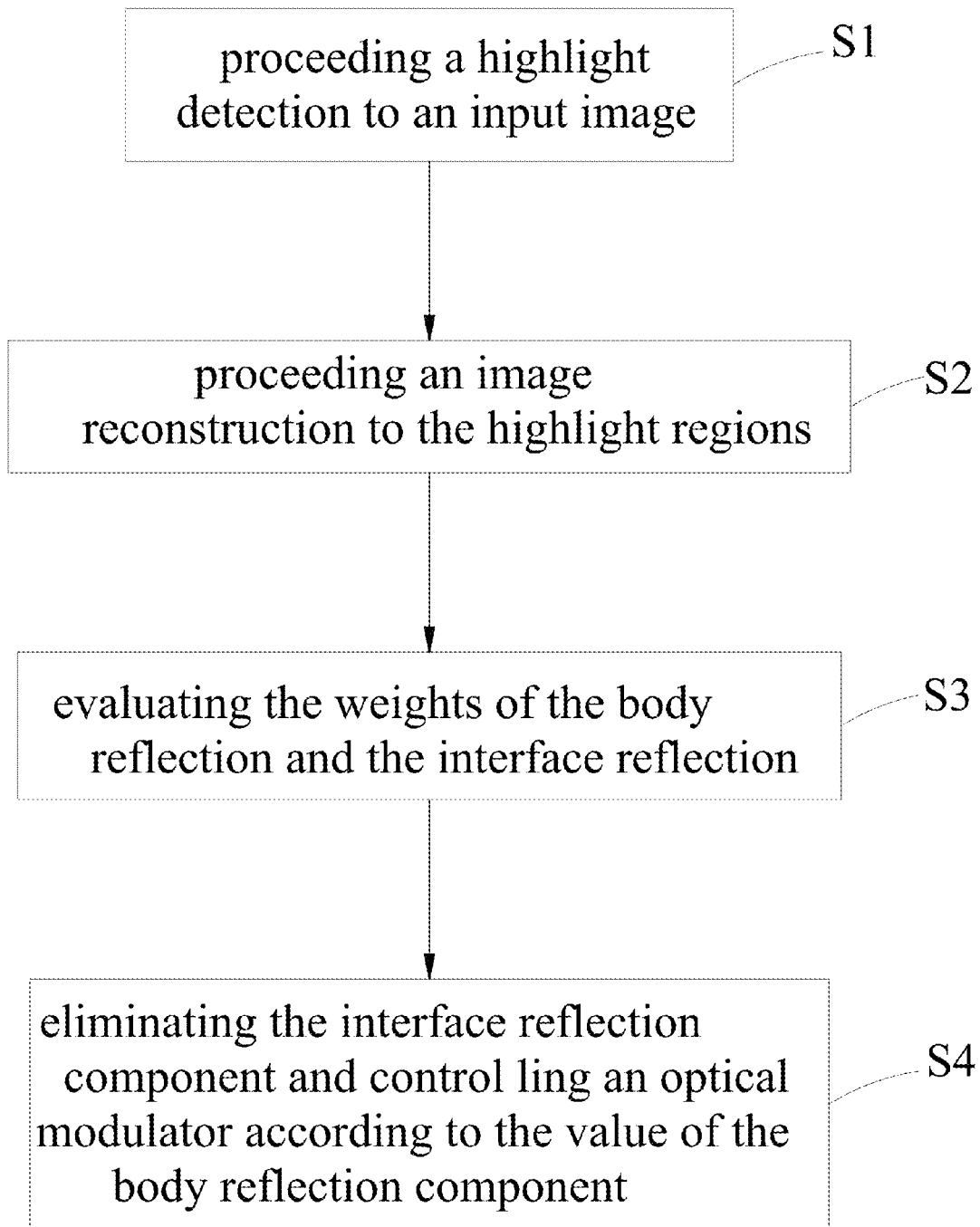
FIG. 1 is a flow chart illustrating a method for controlling reflectivity in imaging system in accordance with the present invention.

With reference to FIG. 1, a method for controlling reflectivity in imaging system in accordance with the present invention has Steps S1-S4. It is noted that the following Steps are proceeded by a computation processor.

Figure 2:
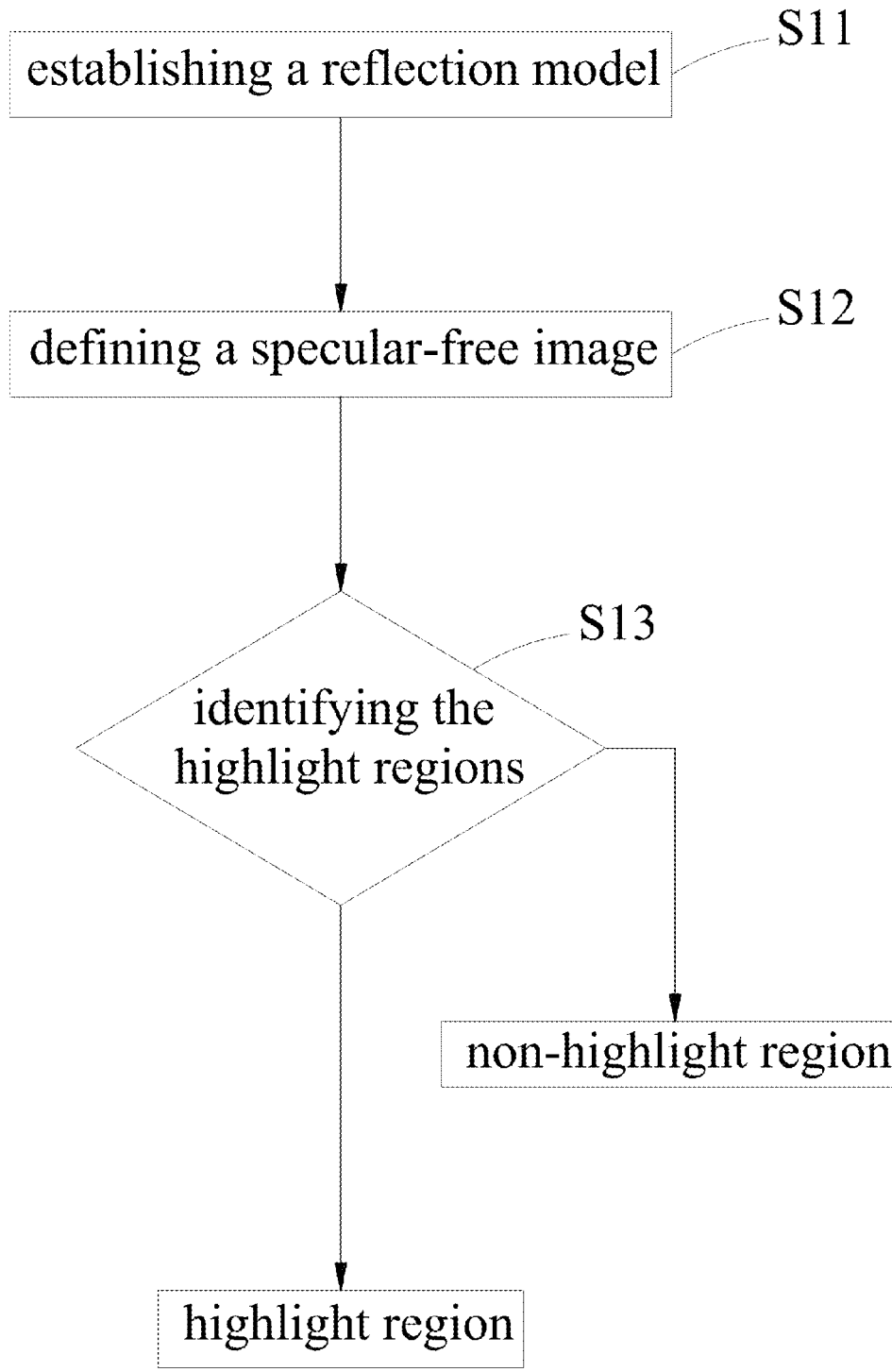
FIG. 2 is a flow chart illustrating Steps S11-13 included in Step S1 of FIG. 1.

Step S1: proceed a highlight detection to an input image. With reference to FIG. 2, the Step S1 further includes Steps S11-S13.

Step S11: establish a reflection model. The input image is consisted of pixels, and a RGB intensity of each pixel located at (x, y) can be expressed as:

$$I(x,y) = K_b(x,y) I_{b(x,y)} + K_i(x,y) I_{i(x,y)} \quad (1)$$

where $I(x, y)$ denotes the RGB intensity of the pixel, $I_b(x, y)$ denotes a chromaticity of body reflection from an object, $I_i(x, y)$ denotes a chromaticity of interface reflection from the object, and $K_b(x, y)$ as well as $K_i(x, y)$ are respectively weight factors of the body reflection and the interface reflection. According to formula (1), which means an image is captured by an imaging system receiving both components of body reflection and interface reflection from the object, wherein the body reflection expresses the object chromatic, and the interface reflection is the origin of image highlight and therefore needed to be eliminated. More specifically, the input image can be a linear combination of a non-highlight image and a highlight image. For most cases, the highlight region in the image is similar to white, and thus $I_i(x, y)$ is a determined value.

Figure 3A:
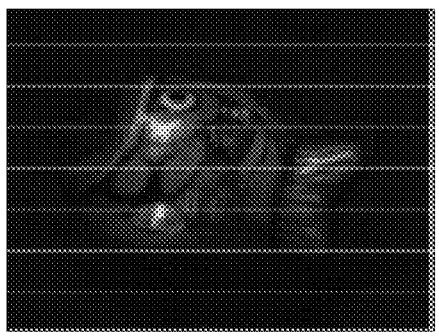
FIGS. 3a-3c are respectively an example of an input image, a modified specular-free image according to the input image and a highlight regions separated from the input image.
Figure 3B:
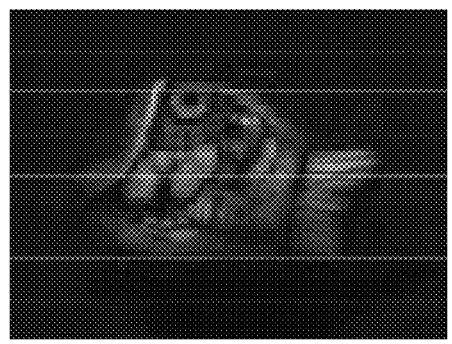
Figure 3C:
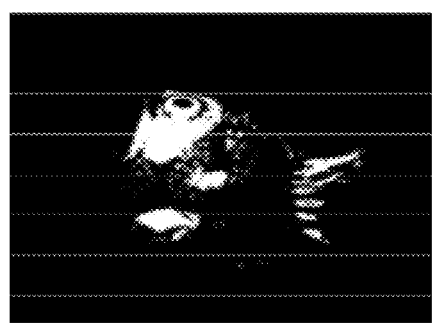

Step S12: with reference to FIGS. 3a-3c, define a specular-free (interface reflection) image $I_{SF}(x, y)$ by subtracting the RGB value of each pixel of the image with the minimum value among the RGB components of the pixel, for example, a pixel with R=100, G=50 and B=30 is subtracted to R=70, G=20 and B=0.

However, the $I_{SF}(x, y)$ may contain noise that generated during the photoelectric conversion. For reducing the noise effect, a modified specular-free image $I_{MSF}(x, y)$, shown in FIG. 3b, is further defined by adding a mean of the sum of minimum values among RGB of the pixels to the $I_{SF}(x, y)$, as the following formula:

$$I_{MSF}(x, y) = I_{SF}(x, y) + \bar{I}_{min} \quad (2)$$

$$\bar{I}_{min} = \frac{\sum_{p} \min(R(x, y), G(x, y), B(x, y))}{\# \text{pixels}} \quad (3)$$

Step S13: identify the highlight regions through a strategy of threshold determination. For each pixel, when the determined $I_i(x, y)$ subtracting the modified specular-free component $I_{MSF}(x, y)$ is large than $\bar{I}_{min}$, the pixel is considered as the highlight region; otherwise the pixel is considered as the non-highlight region. As a result, the highlight image is then obtain, as shown in FIG. 3c.

Step S2: proceed an image reconstruction to the highlight regions detected in Step S13. Even the highlight regions are detected, the real color information of the highlight regions are still missing, namely the component of the body reflection, $K_b(x, y)I_b(x, y)$, in formula (1) is unknown. To reconstruct color information of the highlight regions, each edge pixel of each highlight region is compared to its nearby non-highlight pixels in a predetermined searching area, and the edge pixel copies a most similar chromaticity among these nearby non-highlight pixels as a real color information thereof, which can be written as:

$$p = \mathrm{argmin}_{p \in \Omega} \sum_{i \in R,G,B} \|c_{MSF}(p) - c_{MSF}(q)\| \quad (4)$$

where q denotes the edge pixel of the highlight region, p denotes the nearby non-highlight pixel of q with the most similar chromaticity, $\Omega$ is the predetermined searching area, $c_{MSF}(x, y)$ is the chromaticity of the pixel and defined as:

$$c_{MSF}(x, y) = \frac{I_{MSF}(x, y)}{\sum_{i \in R,G,B} I_{MSF}(x, y)} \quad (5)$$

Step S3: evaluate the weight factors, $K_b(x, y)$ and $K_i(x, y)$, of the body reflection and the interface reflection. After obtaining the reconstruction result from Step S2, the formula (1) can be written as:

$$I(q) = K_b(q)I_b(p) + K_i(q)I_i(q) \quad (6)$$

which means the RGB intensity for each pixel within the highlight regions is the linear combination of a particular weight of its similar pixel and a particular weight of the determined interface reflection. Accordingly, $K_b(x, y)$ and $K_i(x, y)$ is then obtained by the use of least-square estimation.

Step S4: eliminate the interface reflection component of I(q) and control an optical modulator, such as LCOS reflector, to selectively adjust the light flux in the imaging system according to the value of the body reflection component, $K_b(q)I_b(p)$.

The above-mentioned steps of the present invention is applied to deal with the still images. However, to deal with a dynamic image, the method for controlling reflectivity in imaging system is able to cooperating with optical flow algorithm. The method of optical flow is to convert a 3D information of an object movement into a 2D information on the image plane. Such that, the movement of blooming objects, i.e. vehicle headlights, are able to be predicted, and the computation processor is then sending signal to control the optical modulator depending on the prediction. For such optical flow algorithm has been well know in the art, the description thereof is omitted for brevity.

Figure 4:
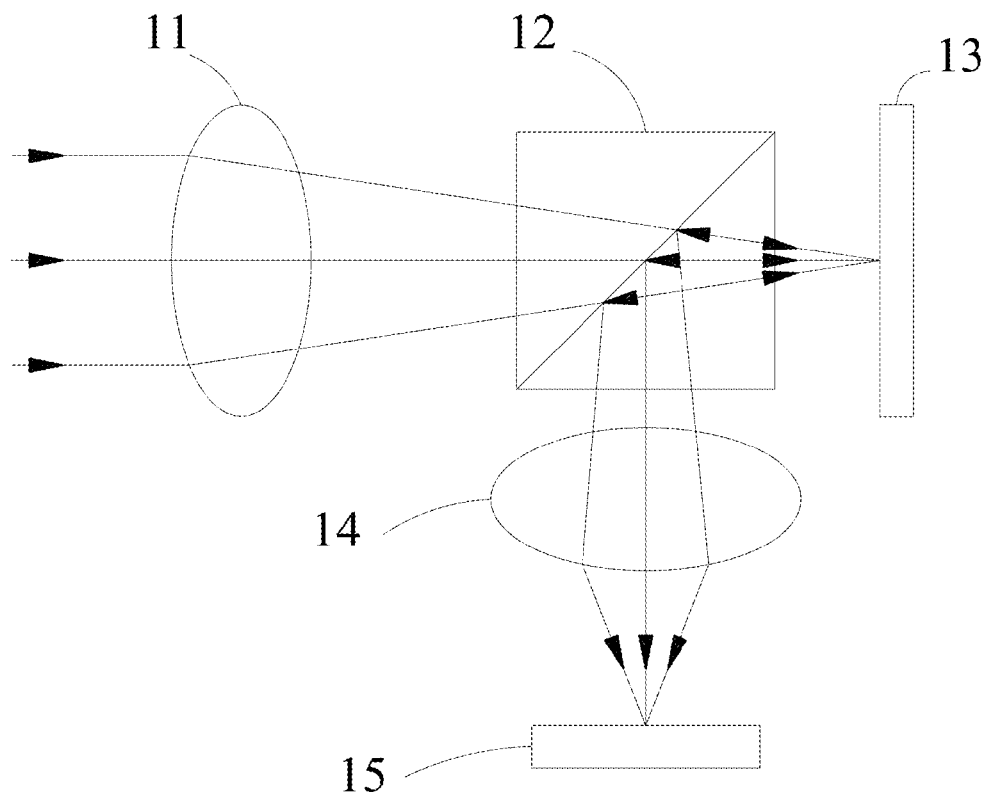
FIG. 4 is an application able to apply the method according to FIG. 1.

With reference to FIG. 4, an application shows a reflective imaging system having a first optical assembly 11, a beam splitter 12, an LCOS reflector 13, a second optical assembly 14 and a light sensor 15. As the illustrated optical path in FIG. 4, a first image is formed on the plane of the LCOS reflector 13, and to be reflected to form a second image on the plane of the light sensor 15. The light sensor 15 converts the light into signals carrying out the Steps S1-4. Finally, the processor commands the LCOS reflector 13 selectively adjusting the reflectivity depending on the output result of Step S4, and the highlight (blooming) within the second image is then correspondingly reduced while presenting a preferred color performance.

Many changes and modifications in the above described embodiment of the invention are able to, of course, be carried out without departing from the scope thereof. Accordingly, to promote the progress in science and the useful arts, the invention is disclosed and is intended to be limited only by the scope of the invention.

What is claimed is:

1. A method for controlling an LCOS reflector in imaging system, proceeded by a computation processor dealing with an input image, comprising steps of:

establishing a model describing the input image as a linear combination of a body reflection and an interface reflection, from objects;

subtracting the minimum component of RGB for each pixel of the input image;

adding a mean of a sum of the minimum RGB chromaticity of the pixels to the input image, to form a modified image;

determining whether the difference between the input image and the modified image is greater/less than a threshold value to identify at least one highlight region and at least one non-highlight region in the input image;

reconstructing color information of the at least one highlight region, by copying similar colors from a predetermined non-highlight area next to the at least one highlight region, and obtaining a reconstructed image as the body reflection;

evaluating weights of the body reflection and the interface reflection for the linear combination by the use of least-square estimation;

eliminating the interface reflection term of the input image and considering the body reflection term as a reference image; and controlling the LCOS reflector to modify the input image according to the reference image.

2. The method for controlling an LCOS reflector in imaging system as claimed in claim 1, wherein the term of the interface reflection is determined depending on the color of blooming effect in the input image.

3. The method for controlling an LCOS reflector in imaging system as claimed in claim 2, wherein the mean of the sum of the minimum RGB chromaticity of the pixels, $\bar{I}_{min}$, is defined as:

$$\bar{I}_{min} = \frac{\sum_p \min(R(x, y), G(x, y), B(x, y))}{\# \text{ pixels}}$$

where #pixels is the number of pixels consisting the input image.

4. The method for controlling an LCOS reflector in imaging system as claimed in claim 3, wherein the threshold value is $\bar{I}_{min}$.

5. The method for controlling an LCOS reflector in imaging system as claimed in claim 4, wherein the step of copying similar colors from a predetermined non-highlight area next to the at least one highlight region is processed by the following formula:

$$p = \operatorname{argmin}_{p \in \Omega} \sum_{i \in R,G,B} \|c_{MSF}(p) - c_{MSF}(q)\|$$

where q denotes an edge pixel of the highlight region, p denotes a nearby non-highlight pixel of q with the most similar chromaticity, $\Omega$ is the predetermined non-highlight area and $C_{MSF}(x,y)$ is the chromaticity of the pixel.

6. The method for controlling an LCOS reflector in imaging system as claimed in claim 5, wherein the step of controlling the LCOS reflector to modify the input image according to the reference, the input image is modified to be consistent with the reference image.

7. The method for controlling an LCOS reflector in imaging system as claimed in claim 1, wherein the mean of the sum of the minimum RGB chromaticity of the pixels, $\bar{I}_{min}$, is defined as:

$$\bar{I}_{min} = \frac{\sum_p \min(R(x,y), G(x,y), B(x,y))}{\# \text{ pixels}}$$

where #pixels is the number of pixels consisting the input image.

8. The method for controlling an LCOS reflector in imaging system as claimed in claim 7, wherein the threshold value is $\bar{I}_{min}$.

9. The method for controlling an LCOS reflector in imaging system as claimed in claim 1, wherein the step of copying similar colors from a predetermined non-highlight area next to the at least one highlight region is processed by the following formula:

$$p = \operatorname{argmin}_{p \in \Omega} \sum_{i \in R,G,B} \|c_{MSF}(p) - c_{MSF}(q)\|$$

where q denotes an edge pixel of the highlight region, p denotes a nearby non-highlight pixel of q with the most similar chromaticity, $\Omega$ is the predetermined non-highlight area and $C_{MSF}(x,y)$ is the chromaticity of the pixel.

10. The method for controlling an LCOS reflector in imaging system as claimed in claim 1, wherein the step of controlling the LCOS reflector to modify the input image according to the reference, the input image is modified to be consistent with the reference image.

\* \* \* \* \*